United States Patent [19]

Chujo et al.

[11] Patent Number: 5,305,309
[45] Date of Patent: Apr. 19, 1994

[54] ECHO CANCELLER

[75] Inventors: Kaoru Chujo, Hachiouji; Masako Katoh, Kawasaki, both of Japan

[73] Assignee: Fujitsu Limited, Kawasaki, Japan

[21] Appl. No.: 974,664

[22] Filed: Nov. 12, 1992

Related U.S. Application Data

[63] Continuation of Ser. No. 623,554, Dec. 6, 1990, abandoned.

[30] Foreign Application Priority Data

Dec. 6, 1989 [JP] Japan .................................. 1-317363
Mar. 5, 1990 [JP] Japan .................................. 2-53321

[51] Int. Cl.$^5$ ............................................. H04B 3/23
[52] U.S. Cl. .................................... 370/32.1; 379/411
[58] Field of Search ................. 370/32.1, 32; 379/406, 379/407, 410, 411; 375/14; 364/724.16

[56] References Cited

U.S. PATENT DOCUMENTS

| | | | |
|---|---|---|---|
| 3,735,055 | 5/1973 | Thomas | 379/410 |
| 4,064,378 | 12/1977 | Kitayama et al. | 370/32.1 |
| 4,467,146 | 8/1984 | Lassaux | 379/407 |
| 4,633,046 | 12/1986 | Kitayama et al. | 370/32.1 |
| 4,679,230 | 7/1987 | Lassaux et al. | 370/32.1 |
| 4,712,235 | 12/1987 | Jones, Jr. | 379/406 |
| 4,757,527 | 7/1988 | Beniston et al. | 379/410 |
| 4,998,241 | 3/1991 | Brox et al. | 370/32.1 |

*Primary Examiner*—Benedict V. Safourek
*Assistant Examiner*—Hassan Kizou
*Attorney, Agent, or Firm*—Staas & Halsey

[57] ABSTRACT

An echo cancellor includes an echo replica generator which generates an echo replica signal based on a received signal, a subtractor which obtains a transmitting side output signal by subtracting the echo replica signal from a transmitting side input signal, a divergence detector which detects a divergence of the echo canceller based on the transmitting side input signal and the echo replica signal and outputs a detection signal when the divergence is detected, and a resetting part which automatically resets the echo replica generator in response to the detection signal from the divergence detector.

23 Claims, 11 Drawing Sheets

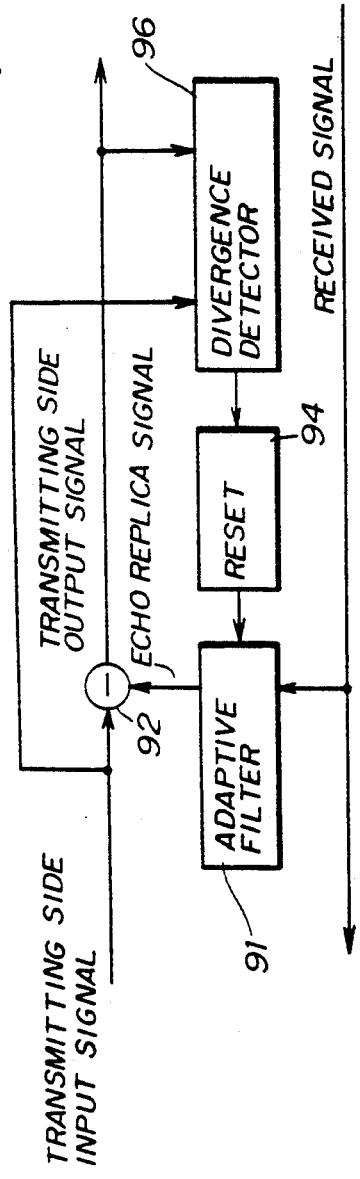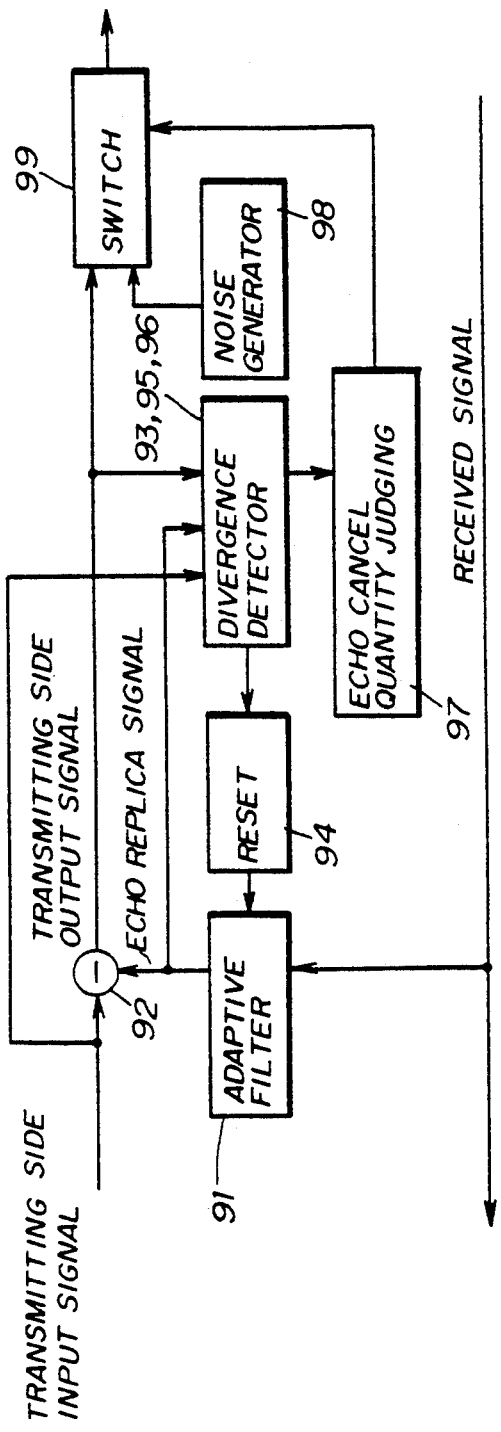

ECHO CANCELLER

This application is a continuation of application Ser. No. 07/623,554, filed Dec. 6, 1990, now abandoned.

BACKGROUND OF THE INVENTION

The present invention generally relates to echo cancellers, and more particularly to an echo canceller which is used in a long-distance telephone system, a telephone conference system, a video telephone conference system and the like.

The echo canceller was developed for the purpose of preventing quality deterioration of communications caused by an echo which occurs in long-distance telephone lines such as satellite communication and submarine cable communication. The echo canceller technology is presently applied in a two-way relay for call diversion service, a relay for telephone conference and the like in order to improve the singing margin. In addition, the echo canceller technology is also applied in a high-efficiency encoder which has a long encoding delay so as to improve the efficiency of the transmission line.

Furthermore, in the case of the video telephone system and a loudspeaker telephone, the sound output from a speaker reflects off the walls of the room and mixes in from a microphone to cause an echo. Hence, the echo canceller is used to eliminate this echo.

A description will now be given of the echo phenomenon which occurs in the long-distance telephone line and the operating principle of the conventional echo canceller.

FIG. 1 is a diagram for explaining the echo phenomenon. Generally, in the long-distance telephone line, the subscriber lines on both ends of the line respectively employ the two-wire circuit for making transmission and reception using two lines. The long-distance telephone line which connects the two subscriber lines employs the four-wire circuit for making transmission and reception using mutually independent lines. Hybrid transformers 41 and 42 are used for the conversion from the two-wire circuit to the four-wire circuit. However, unmatched impedance at the connection point between the two-wire circuit and the four-wire circuit causes a portion of an input signal on the receiving side to leak to the transmitting side via the hybrid transformers 41 and 42. This signal portion which leaks to the transmitting side is generally referred to as an echo.

In the case of a domestic communication, the propagation time of the audio signal is short and the time difference between the transmitted signal and the echo which returns via the connection point on the receiving side is only in the order of 50 msec at the maximum. For this reason, the echo sounds as a sidetone to the speaker and no practical problems are introduced.

On the other hand, in the case of an international communication which uses the satellite line, for example, the propagation time of the going and returning signals between the two parties is approximately 300 msec or more. For this reason, the speaker must talk while listening to his own voice which is returned as echo, and this echo makes it difficult for the speaker to smoothly continue the telephone call.

The echo canceller is designed to suppress this echo, and FIG. 2 shows the operating principle of the conventional echo canceller. Echo cancellers 43 and 44 are arranged respective ends of the four-wire circuit. The echo canceller 43 includes an echo replica generator 431 for generating an echo replica signal by estimating the echo path characteristic and a subtractor 432 for subtracting the echo replica signal from the actual echo signal. Similarly, the echo canceller 44 includes an echo replica generator 441 for generating an echo replica signal by estimating the echo path characteristic and a subtractor 442 for subtracting the echo replica signal from the actual echo signal.

Generally, the echo replica generators 431 and 441 respectively estimate the impulse response of the echo paths using a transversal filter. In order to cope with the change in the impulse response, the filter coefficients of an adaptive filter are usually updated adaptively using the received signal. The adaptive filter in most cases employs an adaptive algorithm in conformance with the learning identification method because a relatively good characteristic can be obtained using a simple hardware structure. In other words, the filter coefficients of the adaptive filter are successively updated so that the square of a residual echo approaches zero.

However, when the learning identification method or a similar adaptive algorithm is used, the estimated impulse response (tap coefficients of the filter) becomes large if a narrow band signal such as a single frequency signal and a low bit rate modem signal obtained by frequency modulation is input. In this case, a divergence phenomenon occurs because a number of bits exceeds a limit determined by the hardware structure.

On the other hand, when the echo canceller is applied to the actual line, the situation is not limited to the case where the line is connected and the echo path exists, but also to a case where the echo path no longer exists due to the switching of the line. For this reason, the echo canceller is not always in a state where the impulse response can be estimated correctly.

In order to cope with the above described case, the echo canceller is usually provided with an internal limiting function for constantly carrying out a stable operation by judging the situation. However, the limiting function cannot always cope with all situations, and the estimation of the impulse response may become impossible due to some reason. When the adaptive operation continues for a long time in the state where the impulse response cannot be estimated, the calculation error is gradually accumulated and may eventually reach divergence.

When the above described divergence phenomenon occurs, the echo cancellers 43 and 44 shown in FIG. 2 form a closed loop. As a result, once the filter coefficients diverge, it is extremely difficult to automatically reset the echo canceller to the normal operation.

The divergence phenomenon occurs in the following case. That is, since the echo canceller carries out a complex process in real time, a digital signal processing circuit is usually used for carrying out the complex process. This means that digital signals are processed. On the other hand, analog signals are transferred in the telephone network.

Accordingly, a conversion circuit for converting the analog signal into the digital signal is required at each echo canceller. In most cases, a PCM coder/decoder is used as the conversion circuit as shown in FIG. 3. In FIG. 3, those parts which are the same as those corresponding parts in FIG. 2 are designated by the same reference numerals, and a description thereof will be omitted. In FIG. 3, a PCM coder/decoder 435 is coupled to the echo canceller 43, while a PCM coder/decoder 445 is coupled to the echo canceller 44. The PCM coders/decoders 435 and 445 respectively use as the output thereof a non-linear 8-bit signal such as a code according to the μ law and the maximum value is restricted.

At the echo canceller 43, for example, the transmitting side input signal is the output signal of the PCM coder/decoder 435 and the maximum level of the transmitting side input signal will not exceed the maximum output value of the PCM coder/decoder 435. On the other hand, since the echo replica is the estimated echo, the echo replica will not exceed the maximum output value of the PCM coder/decoder 435 during a normal operation.

For example, when the echo canceller 43 carries out the digital signal processing using the non-linear 8-bit output signal of the PCM coder/decoder 435, the non-linear 8-bit output signal is first converted into a linear signal before carrying out the signal processing. When making this conversion, the non-linear 8-bit output signal of the PCM coder/decoder 435 is expanded into a 14-bit signal. Furthermore, when carrying out the echo cancelling process in the echo canceller 43, the calculations are in many cases carried out in 14 bits or more so as to ensure a satisfactory calculation accuracy. In such cases, when the estimation of the echo path is not carried out correctly, the calculated echo replica signal may exceed the maximum output value of the PCM coder/decoder 435.

As a result, the transmitting side output signal corresponding to the residual echo may exceed the maximum output value of the PCM coder/decoder 435. However, even in this case, the other echo canceller 44 is unaffected if the transmitting side output signal is again converted into 8 bits in the PCM coder/decoder 435 before being transmitted to the other echo canceller 44.

But when a high efficiency encoder is used in place of the transmission line, for example, the transmitting side output signal is transmitted to the other echo canceller 44 with the value which exceeds the maximum output value of the PCM coder/decoder 435.

Consequently, the value which exceeds the maximum output value of the PCM coder/decoder 435 is input to the other echo canceller 44 as the receiving side input signal. When this value is output to the echo path, the value is suppressed by the PCM coder/decoder 445. This echo path is formed from the other echo canceller 44 to the transmitting side of the echo canceller 43 via the PCM coder/decoder 445, the hybrid transformer 42 and the PCM coder/decoder 445. The above described suppression at the PCM coder/decoder 445 causes nonlinearity between the receiving side input signal and the transmitting side input signal of the other echo canceller 44, and it becomes impossible to carry out a correct echo cancelling operation. Furthermore, the nonlinearity may cause the divergence of the other echo canceller 44.

When the above described divergence phenomenon occurs due to some reason, a trouble is introduced thereby in the communication. Conventionally, there is a problem in that the divergence phenomenon can only be eliminated by manually resetting the echo canceller depending on the operator's judgement.

SUMMARY OF THE INVENTION

Accordingly, it is a general object of the present invention to provide a novel and useful echo canceller in which the problems described above are eliminated.

Another and more specific object of the present invention is to provide an echo canceller comprising echo replica generating means for generating an echo replica signal based on a received signal, subtracting means coupled to the echo replica generating means for obtaining a transmitting side output signal by subtracting the echo replica signal generated by the echo replica generating means from a transmitting side input signal, divergence detecting means coupled to the echo replica generating means and the subtracting means for detecting a divergence of the echo canceller based on the transmitting side input signal and the echo replica signal and for outputting a detection signal when the divergence is detected, and resetting means coupled to the divergence detecting means for automatically resetting the echo replica generating means in response to the detection signal from the divergence detecting means. According to the echo canceller of the present invention, it is possible to automatically self reset the echo canceller by detecting the divergence, thereby improving the reliability of the echo canceller.

Still another object of the present invention is to provide an echo canceller comprising echo replica generating means for generating an echo replica signal based on a received signal, subtracting means coupled to the echo replica generating means for obtaining a transmitting side output signal by subtracting the echo replica signal generated by the echo replica generating means from a transmitting side input signal, divergence detecting means coupled to the echo replica generating means and the subtracting means for detecting a divergence of the echo canceller based on the transmitting side output signal and the echo replica signal and for outputting a detection signal when the divergence is detected, and resetting means coupled to the divergence detecting means for automatically resetting the echo replica generating means in response to the detection signal from the divergence detecting means. According to the echo canceller of the present invention, it is possible to automatically self reset the echo canceller by detecting the divergence, thereby improving the reliability of the echo canceller.

A further object of the present invention is to provide an echo canceller comprising echo replica generating means for generating an echo replica signal based on a received signal, subtracting means coupled to the echo replica generating means for obtaining a transmitting side output signal by subtracting the echo replica signal generated by the echo replica generating means from a transmitting side input signal, divergence detecting means coupled to the echo replica generating means and the subtracting means for detecting a divergence of the echo canceller based on the transmitting side input signal and the transmitting side output signal and for outputting a detection signal when the divergence is detected, and resetting means coupled to the divergence detecting means for automatically resetting the echo replica generating means in response to the detection signal from the divergence detecting means. According to the echo canceller of the present invention, it is possible to automatically self reset the echo canceller by detecting the divergence, thereby improving the reliability of the echo canceller.

Another object of the present invention is to provide an echo canceller comprising echo replica generating means for generating an echo replica signal based on a received signal, subtracting means coupled to the echo replica generating means for obtaining a transmitting side output signal by subtracting the echo replica signal generated by the echo replica generating means from a transmitting side input signal, divergence detecting means coupled to the subtracting means for detecting a divergence of the echo canceller based on the transmitting side input signal, the transmitting side output signal and a receiving side input signal and for outputting a detection signal when the divergence is detected, and resetting means coupled to the divergence detecting means for automatically resetting the echo replica generating means in response to the detection signal from the divergence detecting means. According to the echo canceller of the present invention, it is possible to further improve the reliability of the divergence detection and automatically self reset the echo canceller.

Other objects and further features of the present invention will be apparent from the following detailed description when read in conjunction with the accompanying drawings.

BRIEF DESCRIPTION OF THE DRAWINGS

FIGS. 4 through 7 are system block diagrams for explaining the operating principle of an echo canceller according to the present invention;

DESCRIPTION OF THE PREFERRED EMBODIMENTS

Figure 1:
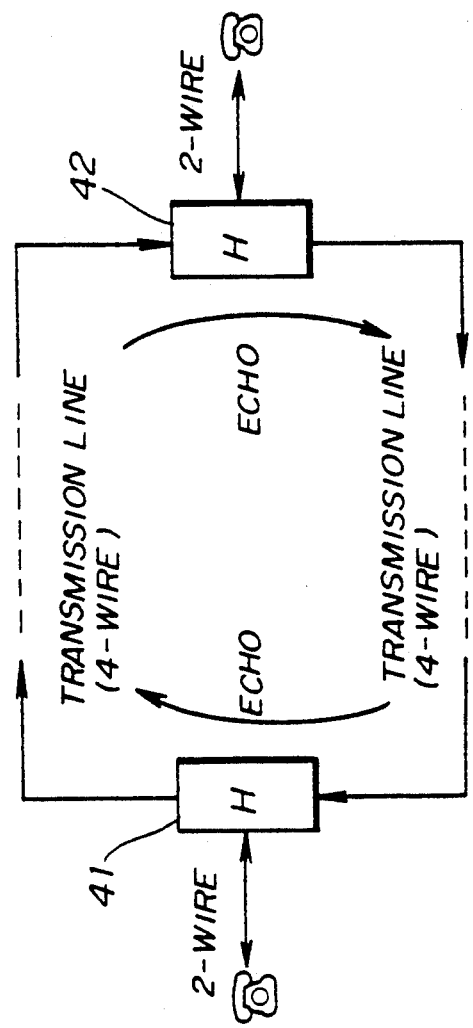
FIG. 1 is a diagram for explaining the echo phenomenon.
Figure 2:
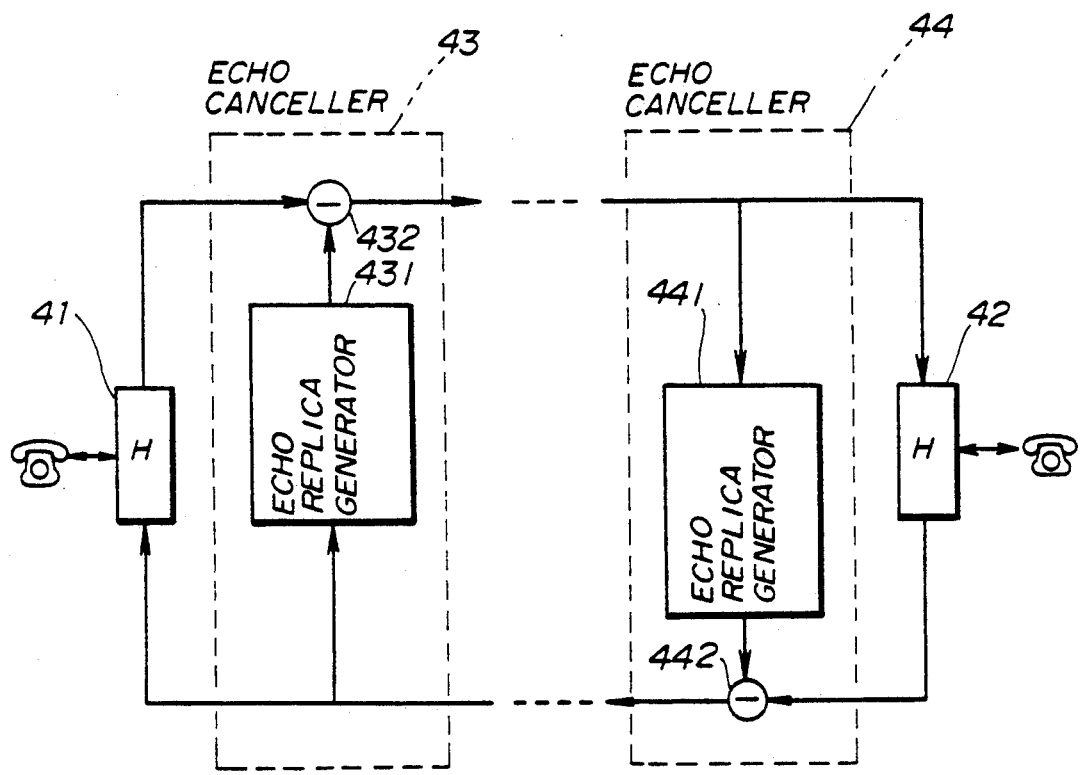
FIG. 2 is a system block diagram for explaining the operating principle of the conventional echo canceller.

First, a description will be given of the operating principle of an echo canceller according to the present invention, by referring to FIGS. 4 through 7.

In FIGS. 4 through 7, an adaptive filter 91 generates an echo replica signal based on a received signal. A subtractor 92 subtracts the echo replica signal from a transmitting side input signal and outputs a transmitting side output signal. Divergence detectors 93, 95 and 96 respectively detect a divergence as will be described later. A reset circuit 94 resets an echo canceller circuit which includes the adaptive filter 91 in response to a detection signal from the divergence detector 93, 95 or 96.

Figure 4:
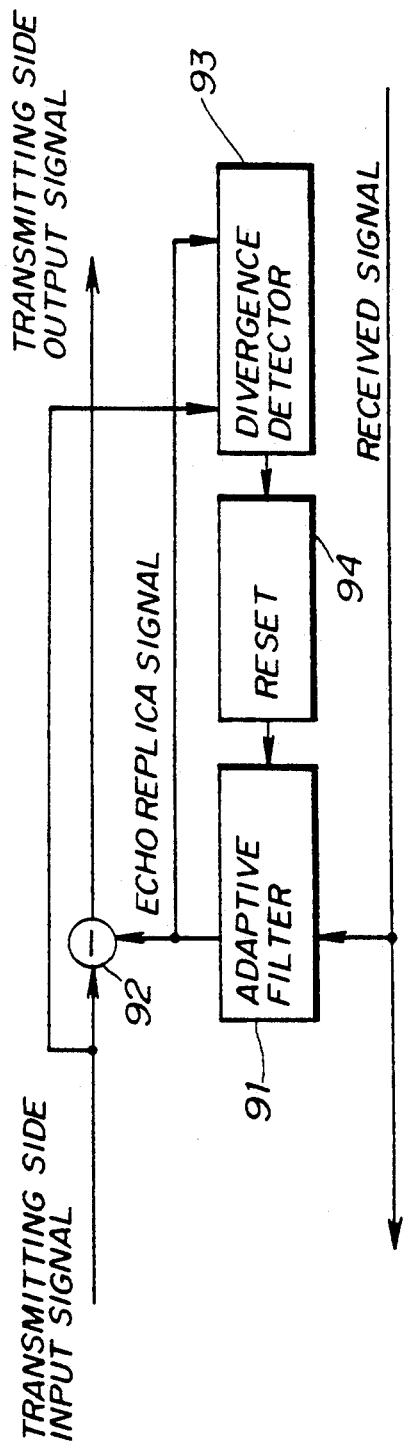

According to one aspect of the present invention, the echo replica signal is generated from the adaptive filter 91 shown in FIG. 4 based on the received signal, and the echo replica signal is subtracted from the transmitting side input signal in the subtractor 92 to obtain the transmitting side output signal. The echo replica signal is compared with the transmitting side input signal in the divergence detector 93, and the divergence detector 93 detects a divergence when the ratio of the echo replica signal to the transmitting side input signal becomes greater than a predetermined ratio. In addition, when the divergence detector 93 detects the divergence, the reset circuit 94 resets the echo canceller.

Figure 5:
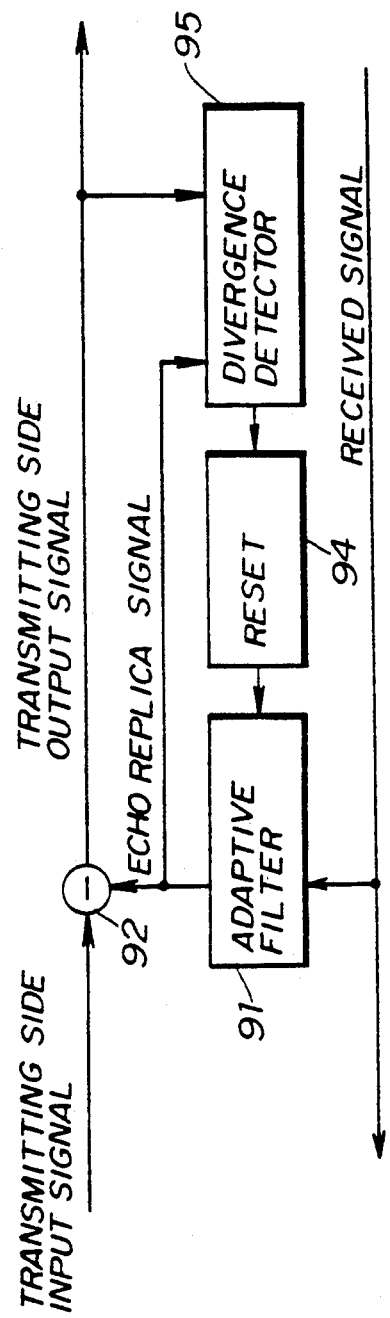

According to another aspect of the present invention, the echo replica signal is generated from the adaptive filter 91 shown in FIG. 5 based on the received signal, and the echo replica signal is subtracted from the transmitting side input signal in the subtractor 92 to obtain the transmitting side output signal. At least one of the echo replica signal and the transmitting side output signal is compared with a predetermined threshold value which is determined based on a maximum value of the transmitting side input signal in the divergence detector 95, and the divergence detector 93 detects a divergence when the compared signal exceeds the threshold value. In addition, when the divergence detector 95 detects the divergence, the reset circuit 94 resets the echo canceller.

According to still another aspect of the present invention, the divergence detector 95 shown in FIG. 5 compares the echo replica signal and the transmitting side output signal with the threshold value, and the divergence detector 95 detects a divergence when both the compared signals exceed the threshold value.

According to a further aspect of the present invention, the echo replica signal is generated from the adaptive filter 91 shown in FIG. 6 based on the received signal, and the echo replica signal is subtracted from the transmitting side input signal in the subtractor 92 to obtain the transmitting side output signal. The divergence detector 96 compares the transmitting side input signal and the transmitting side output signal. The divergence detector 96 detects a divergence when the ratio of the transmitting side input signal to the transmitting side output signal becomes greater than a predetermined ratio and the transmitting side output signal exceeds a predetermined threshold value which is determined based on a maximum value of the transmitting side input signal. In addition, when the divergence detector 96 detects the divergence, the reset circuit 94 resets the echo canceller.

According to another aspect of the present invention, there is further provided an echo cancelling quantity judging circuit 97, a noise generator 98 and a switching circuit 99 shown in FIG. 7 in addition those elements shown in FIG. 4, 5 or 6. The echo cancelling quantity judging circuit 97 judges the echo cancelling quantity of the echo canceller. The noise generator 98 generates a band limited low level noise which is in the range of the line noise. The switching circuit 99 selects the low level noise from the noise generator 98 as the transmitting side output signal which is transmitted to the other party when the echo cancelling quantity judging circuit 97 judges that the echo cancelling quantity is small.

In the divergence detectors 93, 95 and 96 described above, the signal power, the signal amplitude and the like may be used for the signal comparison. When the signal amplitude is used for the signal comparison, it is desirable to use a time average value.

According to the echo canceller shown in FIG. 4, the divergence detector 93 monitors the echo replica signal and the transmitting side input signal. The divergence detector 93 detects the divergence of the echo canceller and outputs the detection signal when the ratio of the echo replica signal to the transmitting side input signal becomes greater than a predetermined ratio. The reset circuit 94 clears the tap values and tap coefficients of the adaptive filter 91 in response to the detection signal, so as to initialize the echo canceller. As a result, the echo canceller is self reset.

On the other hand, according to the echo canceller shown in FIG. 5, the divergence detector 95 monitors whether or not the echo replica signal or the transmitting side output signal exceeds a predetermined threshold value, because the echo replica signal or the transmitting side output signal exceeds the predetermined threshold value when the divergence occurs. The reset circuit 94 clears the tap values or tap coefficients of the adaptive filter 91 in response to the detection signal, so as to initialize the echo canceller. As a result, the echo canceller is self reset.

In this case, the divergence detector 95 may be designed to detect the divergence when both the echo replica signal and the transmitting side output signal exceed the predetermined threshold value. The reliability of the divergence detection is improved in this case.

According to the echo canceller shown in FIG. 6, the divergence detector 96 detects the divergence when the ratio of the transmitting side input signal to the transmitting side output signal becomes greater than a predetermined ratio and the transmitting side output signal exceeds a predetermined threshold value. When the divergence detector 96 detects the divergence, the reset circuit 94 resets the echo canceller.

Furthermore, according to the echo canceller shown in FIG. 7, when the divergence is detected and the echo canceller is reset, the echo cancelling quantity judging circuit 97 judges this state so that the echo which is not cancelled will not be transmitted to the other party until the tap coefficients of the adaptive filter 91 converge and a sufficient echo cancelling is made. When the echo cancelling quantity judging circuit 97 detects the above described state, the echo cancelling quantity judging circuit 97 switches the switching circuit 99 so that the low level noise from the noise generator 98 is transmitted to the other party as the transmitting side output signal. As a result, it is possible to stabilize the echo cancelling characteristic of the echo canceller.

Next, a description will be given of a first embodiment of the echo canceller according to the present invention, by referring to FIG. 8.

Figure 8:
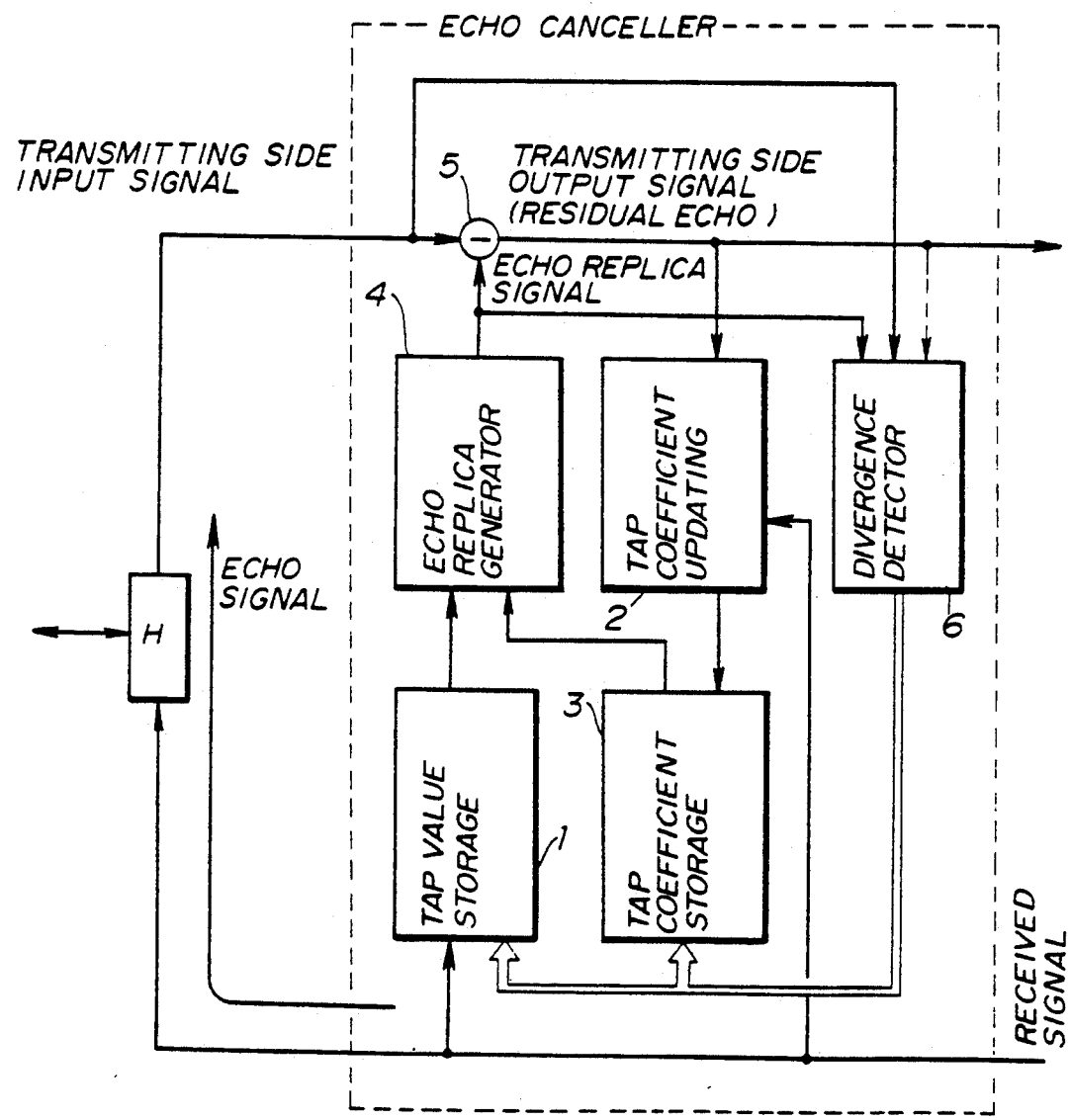
FIG. 8 is a system block diagram showing a first embodiment of the echo canceller according to the present invention.

In FIG. 8, the echo canceller is surrounded by a dotted line. The echo canceller includes a tap value storage 1 for successively storing a received signal sequence as tap values, a tap coefficient storage 3 for storing a tap coefficient of each tap value, an echo replica generator 4 for generating an echo replica signal based on the tap value and the tap coefficient, a subtractor 5 for subtracting the echo replica signal from the transmitting side input signal and for outputting the transmitting side output signal (that is, a residual echo signal), a tap coefficient updating circuit 2 for updating the tap coefficients based on the received signal and the transmitting side output signal so that the estimated impulse response converges, and a divergence detector 6 for detecting the filter divergence based on the transmitting side input signal and the echo replica signal.

An output detection signal of the divergence detector 6 is supplied to the tap value storage 1 and the tap coefficient storage 3, so as to clear the tap values stored in the tap value storage 1 and clear the tap coefficients stored in the tap coefficient storage 3 when the divergence is detected. The tap value storage 1, the tap coefficient updating circuit 2, the tap coefficient storage 3 and the echo replica generator 4 form a transversal type adaptive digital filter.

Figure 9:
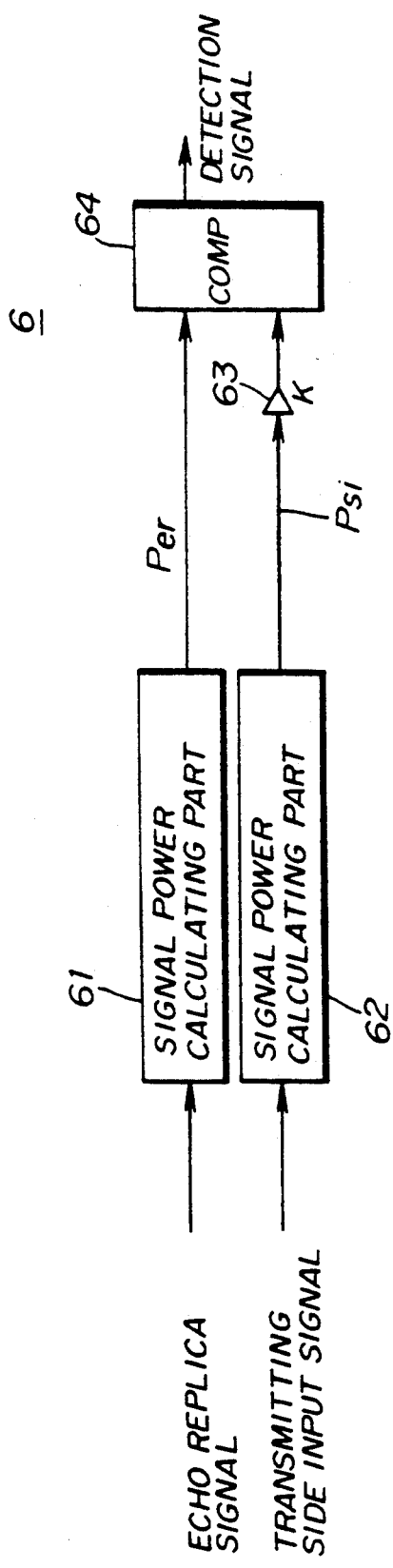
FIG. 9 is a system block diagram showing an embodiment of a divergence detector shown in FIG. 8.

FIG. 9 shows an embodiment of the divergence detector 6. The divergence detector 6 includes signal power calculating parts 61 and 62, a coefficient multiplier 63, and a comparator 64 which are coupled as shown. The signal power calculating part 61 calculates a signal power $P_{er}$ of the echo replica signal, and the signal power calculating part 62 calculates a signal power $P_{si}$ of the transmitting side input signal. The coefficient multiplier 63 multiplies a predetermined coefficient K to the transmitting side input signal power $P_{si}$ which is calculated in the signal power calculating part 62. The predetermined coefficient K is slightly larger than 1. The comparator 64 compares the echo replica signal power $P_{er}$ which is calculated in the signal power calculating part 61 and the signal power $K \times P_{si}$ which is output from the coefficient multiplier 63, and outputs a detection signal which indicates whether or not the divergence has occurred depending on the result of the comparison.

Figure 10:
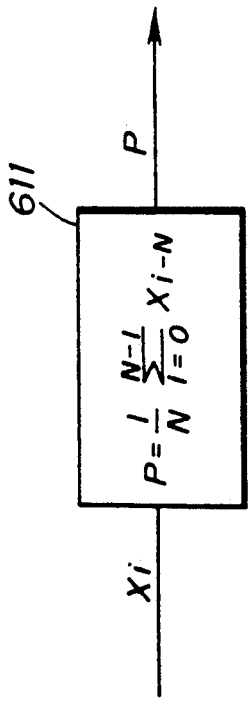

The signal power calculating parts 61 and 62 may calculate the signal power P as shown in FIG. 10, that is, by obtaining a square of the amplitude within a predetermined interval.

$$P = (1/N) \sum_{i=0}^{N-1} X_{i-n}$$

Figure 11:
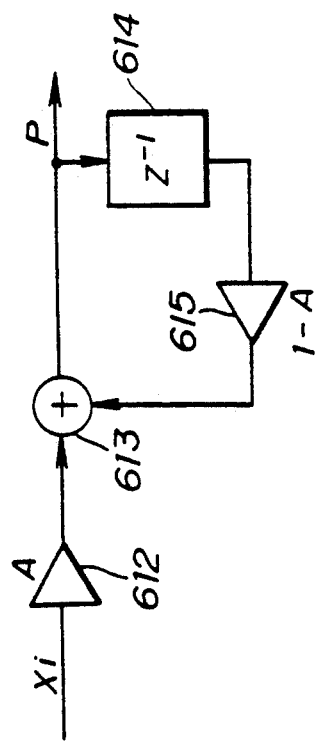
FIGS. 10 and 11 are system block diagrams for explaining methods of calculating the signal power in a signal power calculation part shown in FIG. 8.

Alternatively, the signal power P may be calculated by the method which obtains the leaky integral as shown in FIG. 11. In FIG. 11, the signal power calculating part includes a coefficient multiplier 612 which multiplies a coefficient A to an input signal $X_i$, an adder 613 which receives an output of the coefficient multiplier 612 and outputs a signal power P, a delay circuit 614 which delays an output of the adder 613, and a coefficient multiplier 615 which multiplies a coefficient 1-A to an output of the delay circuit 614 and supplies an output to the adder 613.

Figure 12:
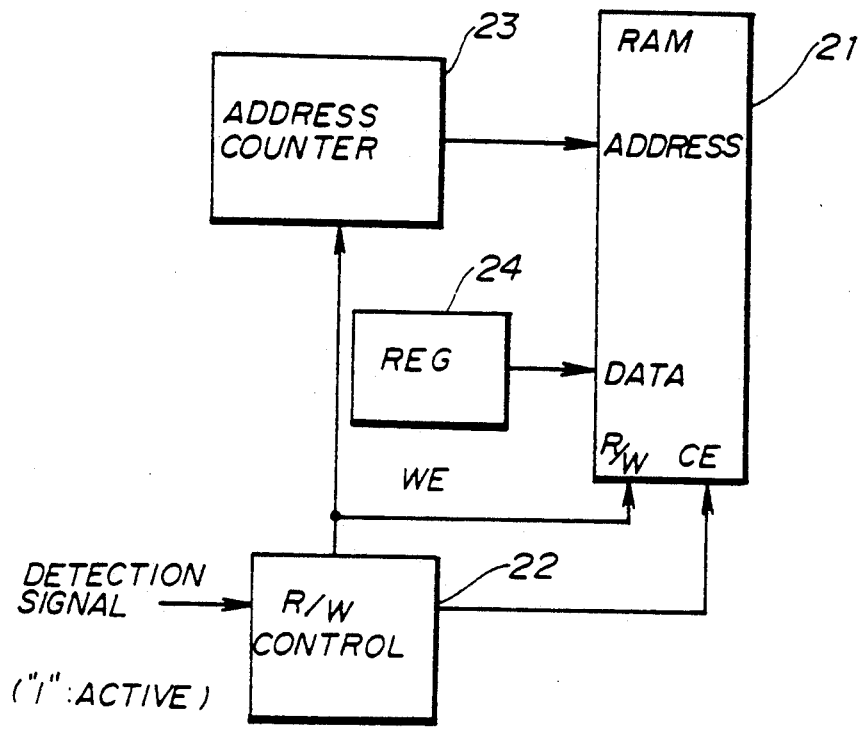
FIG. 12 is a system block diagram showing an embodiment of a clear circuit for clearing stored data in a tap value storage and a tap coefficient storage shown in FIG. 8.

FIG. 12 shows an embodiment of a clear circuit for clearing the stored data in the tap value storage 1 and the tap coefficient storage 3. The clear circuit includes a random access memory (RAM) 21, a read/write control circuit 22, an address counter 23 and a zero register 24 which are coupled as shown. The RAM 21 successively stores the tap values and the tap coefficients. The read/write mode of the RAM 21 is controlled by the read/write control circuit 22. The address counter 23 successively updates the address of the RAM 21, and the zero register 24 stores the value "0" as the write data which is used when making the reset operation. In FIG. 12, CE denotes a chip enable signal, W/R denotes a read/write signal and WE denotes a write enable signal.

The output detection signal of the divergence detector 6 is supplied to the read/write control circuit 22. Hence, when the divergence is detected, the address counter 23 is reset under the control of the read/write controller 22 and successively increments the address from the address "0" to the last address. In addition, the value "0" which is stored in the zero register 24 is supplied to the RAM 21 as the write data, so that all of the data stored in the RAM 21 can be cleared to "0".

The echo replica signal which is generated in the echo replica generator 4 is calculated by estimating in the adaptive filter part the echo signal which leaks from the receiving side to the transmitting side. When making a one-way communication (that is, single talk), it may be regarded that the signal power is approximately the same as that of the transmitting side input signal after the echo canceller converges. In addition, even during the transition period in which the echo canceller converges, it may be regarded that the ratio of the echo replica signal power $P_{er}$ to the transmitting side input signal power $P_{si}$ will not become greater than a predetermined ratio as long as the tap coefficients converge in the correct direction.

Moreover, when making a two-way simultaneous communication (that is, double talk), a near-end speaker input signal is added to the echo signal as the transmitting side input signal. For this reason, it may be regarded that the transmitting side input signal power $P_{si}$ becomes sufficiently large compared to the echo replica signal power $P_{er}$.

Accordingly, when the echo replica signal power $P_{er}$ exceeds the transmitting side input signal power $P_{si}$, the tap coefficients of the adaptive filter part are being updated in the wrong direction and a signal unrelated to the echo is generated therein. In other words, it may be judged that the divergence has occurred.

The divergence detector 6 detects the existence of the above described divergence. The echo replica signal power $P_{er}$ and the transmitting side input signal power $P_{si}$ are respectively calculated in the signal power calculating parts 61 and 62, and the coefficient multiplier 63 multiplies the coefficient K to the transmitting side input signal power $P_{si}$ by taking into account a certain margin. When $P_{si} \times K - P_{er} \geq 0$ as a result of the comparison in the comparator 64, no divergence has occurred. On the other hand, a divergence has occurred when $P_{si} \times K - P_{er} < 0$ as a result of the comparison in the comparator 64.

When the divergence detector 6 detects that the adaptive filter part has diverged, the detection signal is supplied from the comparator 64 shown in FIG. 9 to the tap value storage 1 and the tap coefficient storage 3 shown in FIG. 8. Hence, the tap value and the tap coefficients of the adaptive filter part are cleared, and the echo canceller is reset. Therefore, even when the divergence occurs, it is possible to automatically self reset the echo canceller.

Various modifications of the first embodiment are possible.

Figure 13:
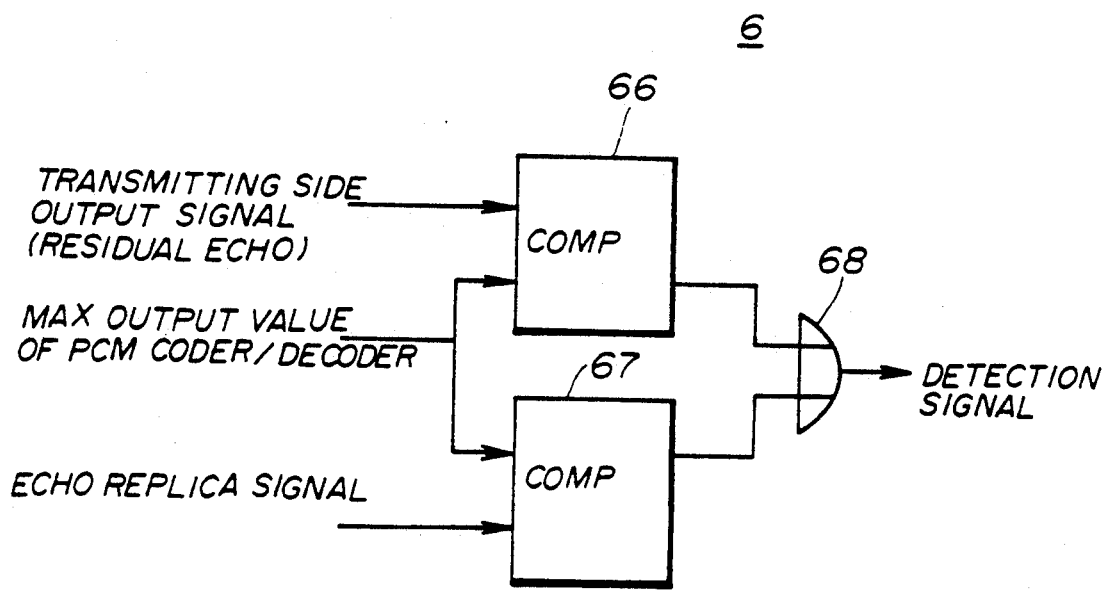
FIG. 13 is a system block diagram showing an essential part of a modification of the first embodiment.

FIG. 13 shows an essential part of a modification of the first embodiment shown in FIG. 8. In this modification, the construction of the echo canceller is basically the same as that shown in FIG. 8 but the construction of the divergence detector 6 is modified. Unlike the embodiment shown in FIG. 8, the divergence detector 6 of this modification receives the echo replica signal from the echo replica generator 4 and the transmitting side output signal from the subtractor 5 as indicated by a phantom line in FIG. 8 and does not receive the transmitting side input signal.

The divergence detector 6 shown in FIG. 13 includes comparators 66 and 67, and an OR circuit 68 which are connected as shown. The transmitting side output signal (residual echo signal) is supplied to the comparator 66 and the echo replica signal is supplied to the comparator 67. In addition, a maximum output value (for example, +3.17 dBm0) of a PCM coder/decoder is supplied to the two comparators 66 and 67 as a reference value.

Figure 3:
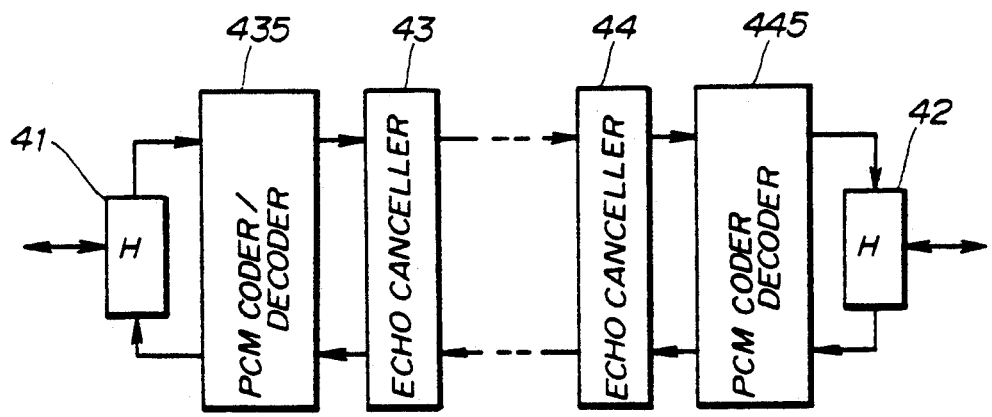
FIG. 3 is a system block diagram for explaining a PCM coder/decoder used with the conventional echo canceller.

As described above in conjunction with FIG. 3, the PCM coder/decoder carries out the analog-to-digital conversion and digital-to-analog conversion of signals between the echo canceller and the line. The output of the PCM coder/decoder is the transmitting side input signal of the echo canceller, and the maximum output value of the output of the PCM coder/decoder is restricted.

The comparator 66 compares the transmitting side output signal with the reference value and supplies the detection signal to the OR circuit 68 when the transmitting side output signal is greater than the reference value. Similarly, the comparator 67 compares the echo replica signal with the reference value and supplies the detection signal to the OR circuit 68 when the echo replica signal is greater than the reference value.

It may be regarded that the echo replica signal which is generated from the echo replica generator 4 or the transmitting side output signal (residual echo) which is obtained by subtracting the echo replica signal from the transmitting side input signal in the subtractor 5 will not exceed the maximum output value of the PCM coder/decoder when the echo canceller is operating normally. Accordingly, when the echo replica signal or the transmitting side output signal exceeds the maximum output value of the PCM coder/decoder, it may be judged that the adaptive filter part is carrying out an erroneous operation, that is, a divergence has occurred.

The comparators 66 and 67 of the divergence detector 6 make the above described judgement on whether or not the divergence has occurred. The detection signal which indicates the occurrence of the divergence is output via the OR circuit 68 when at least one of the transmitting side output signal and the echo replica signal exceeds the maximum output value of the PCM coder/decoder. This detection signal is supplied to the tap value storage 1 and the tap coefficient storage 3 and resets the echo canceller as described above, so that the echo canceller self resets from the divergent state.

In this modification, the divergence detector 6 detects the divergence when the transmitting side output signal or the echo replica signal exceeds the maximum output value of the PCM coder/decoder. However, as another modification of the first embodiment, the OR circuit 68 shown in FIG. 13 may be replaced by an AND circuit (not shown). In this case, the divergence is detected only when both the transmitting side output signal and the pseudo error signal exceed the maximum output value of the PCM coder/decoder, thereby improving the reliability of the divergence detection.

As a further modification of the first embodiment, the divergence detector 6 may detect the divergence based on only one of the transmitting side output signal and the echo replica signal.

Figure 14:
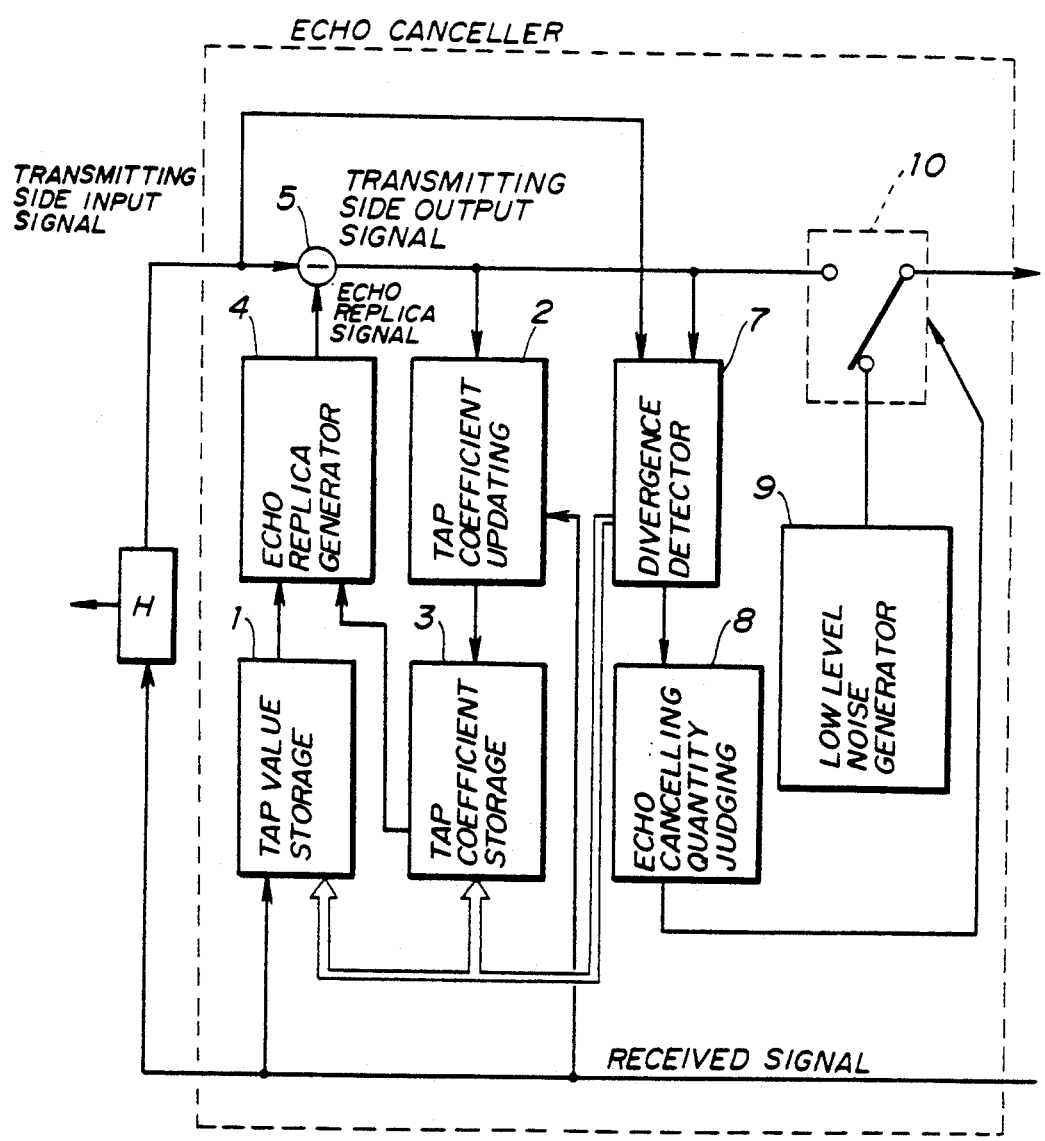
FIG. 14 is a system block diagram showing a second embodiment of the echo canceller according to the present invention.

FIG. 14 shows a second embodiment of the echo canceller according to the present invention. In FIG.

14, those parts which are the same as those corresponding parts in FIG. 8 are designated by the same reference numerals, and a description thereof will be omitted.

In this embodiment, a divergence detector 7 is used in place of the divergence detector 6, and a mechanism is provided to transmit a dummy audio signal to the other party when resetting the echo canceller until the adaptive filter part sufficiently converges.

In FIG. 14, the transmitting side input signal and the transmitting side output signal are supplied to the divergence detector 7. An output detection signal of the divergence detector 7 is supplied to an echo cancelling quantity judging circuit 8 which judges an echo canceling quantity. The echo canceling quantity is based on whether or not the echo cancelling operation of the adaptive filter part is carried out appropriately.

A output judgement signal of the echo cancelling quantity judging circuit 8 is used as a control signal for controlling the switching of a switching circuit 10. The switching circuit 10 selectively outputs to the line the transmitting side output signal from the subtractor 5 or a low level noise which is generated from a low level noise generator 9 in response to the control signal. The low level noise generated from the low level noise generator 9 is limited to the band limited to the voice grade and is used as a pseudo transmitting signal.

Figure 15:
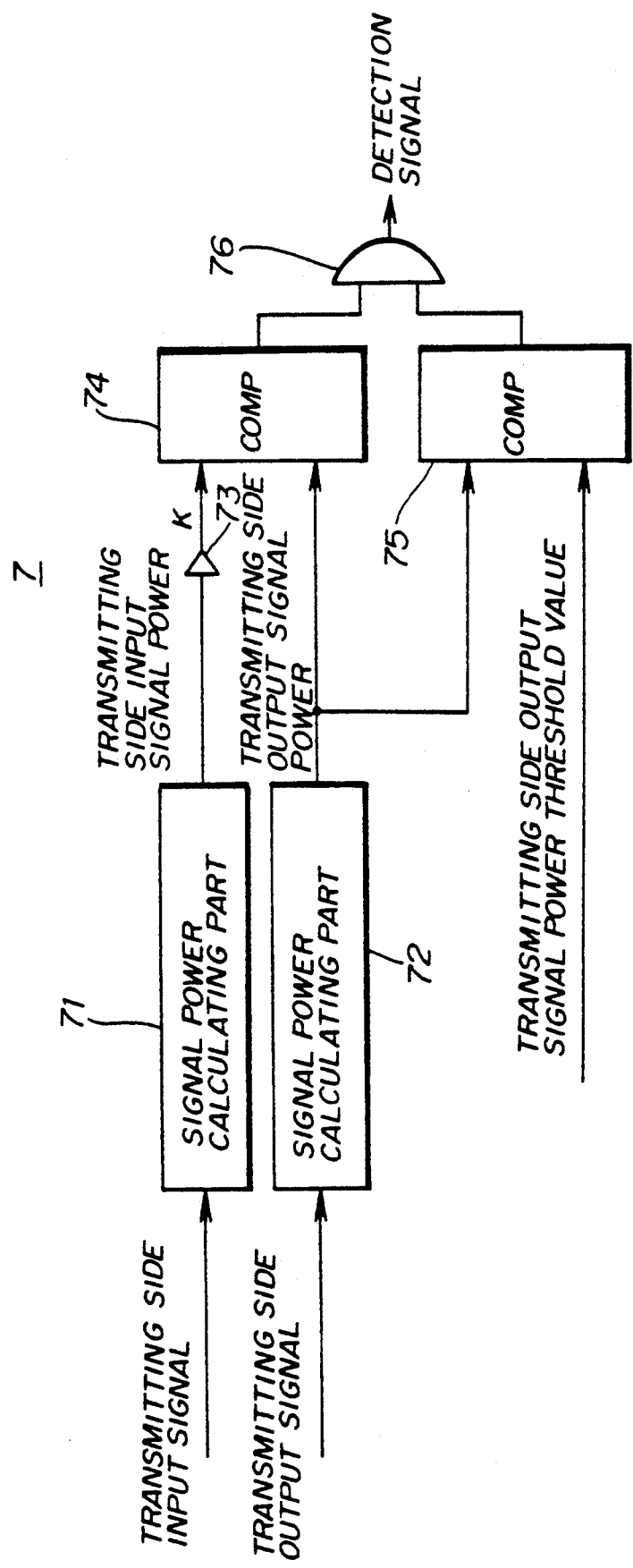
FIG. 15 is a system block diagram showing an embodiment of a divergence detector shown in FIG. 14.

FIG. 15 shows an embodiment of the divergence detector 7 of the second embodiment. The divergence detector 7 includes signal power calculating parts 71 and 72, a coefficient multiplier 73, comparators 74 and 75, and an AND circuit 76 which are connected as shown.

The signal power calculating parts 71 and 72 respectively calculate the signal powers of the transmitting side input signal and the transmitting side output signal. The coefficient multiplier 73 multiplies a predetermined coefficient K to a transmitting side input signal power $P_{si}$ which is output from the signal power calculating part 71. The predetermined coefficient K is slightly larger than 1. The comparator 74 compares a signal power $K \times P_{si}$ and a transmitting side output signal power $P_{so}$ which is output from the signal power calculating part 72. The comparator 75 compares the transmitting side output signal power $P_{so}$ and a predetermined threshold value TH of the transmitting side output signal power $P_{so}$. The AND circuit 76 outputs a detection signal based on output signals of the comparators 74 and 75.

For example, the signal power calculating parts 71 and 72 may use the methods described in conjunction with FIGS. 10 and 11.

The predetermined coefficient K of the coefficient multiplier 73 is set slightly larger than 1 by taking into consideration a certain margin. In addition, the threshold value TH which is supplied to the comparator 75 is set based on the maximum output value of the PCM coder/decoder by taking into account a certain margin of the signal power which corresponds to the maximum output value.

The divergence detector 7 monitors the transmitting side input signal power $P_{si}$ and the transmitting side output signal power $P_{so}$. The comparator 74 supplies the detection signal to the AND circuit 76 when the ratio of the transmitting side output signal power $P_{so}$ to the transmitting side input signal power $P_{si}$ exceeds a predetermined ratio. On the other hand, the comparator 75 supplies the detection signal to the AND circuit 76 when the ratio of the transmitting side output signal power $P_{so}$ to the threshold value TH exceeds a predetermined ratio.

In other words, the divergence detector 7 detects the divergence when $P_{so} > TH$ and $P_{si} \times K < P_{so}$. When the divergence is detected, the divergence detector 7 supplies the detection signal to the tap value storage 1 and the tap coefficient storage 3.

The divergence can be detected by the divergence detector 7 for the following reasons. That is, the transmitting side output signal becomes a maximum when both parties speak at the maximum level during the simultaneous two-way communication. Hence, when the echo cancelling operation is carried out appropriately by the echo canceller, the transmitting side output signal will not exceed the maximum output value of the PCM coder/decoder.

The threshold value TH of the transmitting side output signal power $P_{so}$ is set by taking into account a certain margin of the signal power which corresponds to the maximum output value of the PCM coder/decoder, by supposing a case where the echo replica signal is not at all subtracted within the echo canceller. Accordingly, as long as the tap coefficients of the adaptive filter part converge in the correct direction, it may be regarded that the transmitting side output signal power $P_{so}$ will not exceed the threshold value TH. In addition, during the normal operation of the echo canceller, the transmitting side output signal is obtained by subtracting the echo replica signal from the transmitting side input signal, and it may also be regarded that the ratio of the transmitting side output signal power $P_{so}$ to the transmitting side input signal power $P_{si}$ will not exceed a predetermined ratio.

Therefore, when the transmitting side output signal power $P_{so}$ exceeds the threshold value TH and the ratio of the transmitting side output signal power $P_{so}$ to the transmitting side input signal power $P_{si}$ also exceeds the predetermined ratio, it may be regarded that the tap coefficients are being updated in the wrong direction within the echo canceller and signals unrelated to the echo are being generated therein. Hence, in this case, it may be regarded that a divergence has occurred.

When the divergence detector 7 detects the divergence in the above described manner, the tap values in the tap value storage 1 and the tap coefficients in the tap coefficient storage 3 are cleared and the circuit is initialized. As a result, the echo canceller is automatically self reset from the divergent state.

When making the initializing operation, the echo cancelling is not carried out sufficiently during a transition period in which the tap coefficients converge to appropriate values. Hence, the echo which is not cancelled will be output to the other party, thereby displaying an undesirable characteristic as the echo canceller.

Hence, in this embodiment, the echo cancelling quantity judging circuit 8 judges the echo cancelling quantity within the echo canceller. The echo cancelling quantity judging circuit 8 controls the switching circuit 10 to output the low level noise output from the low level noise generator 9 until the echo cancelling is carried out to a sufficient extent. In this case, the low level noise which is band limited to the voice grade is transmitted to the other party as the transmitting side output signal during the transition period, and the stability of the echo cancelling characteristic is ensured.

Figure 16:
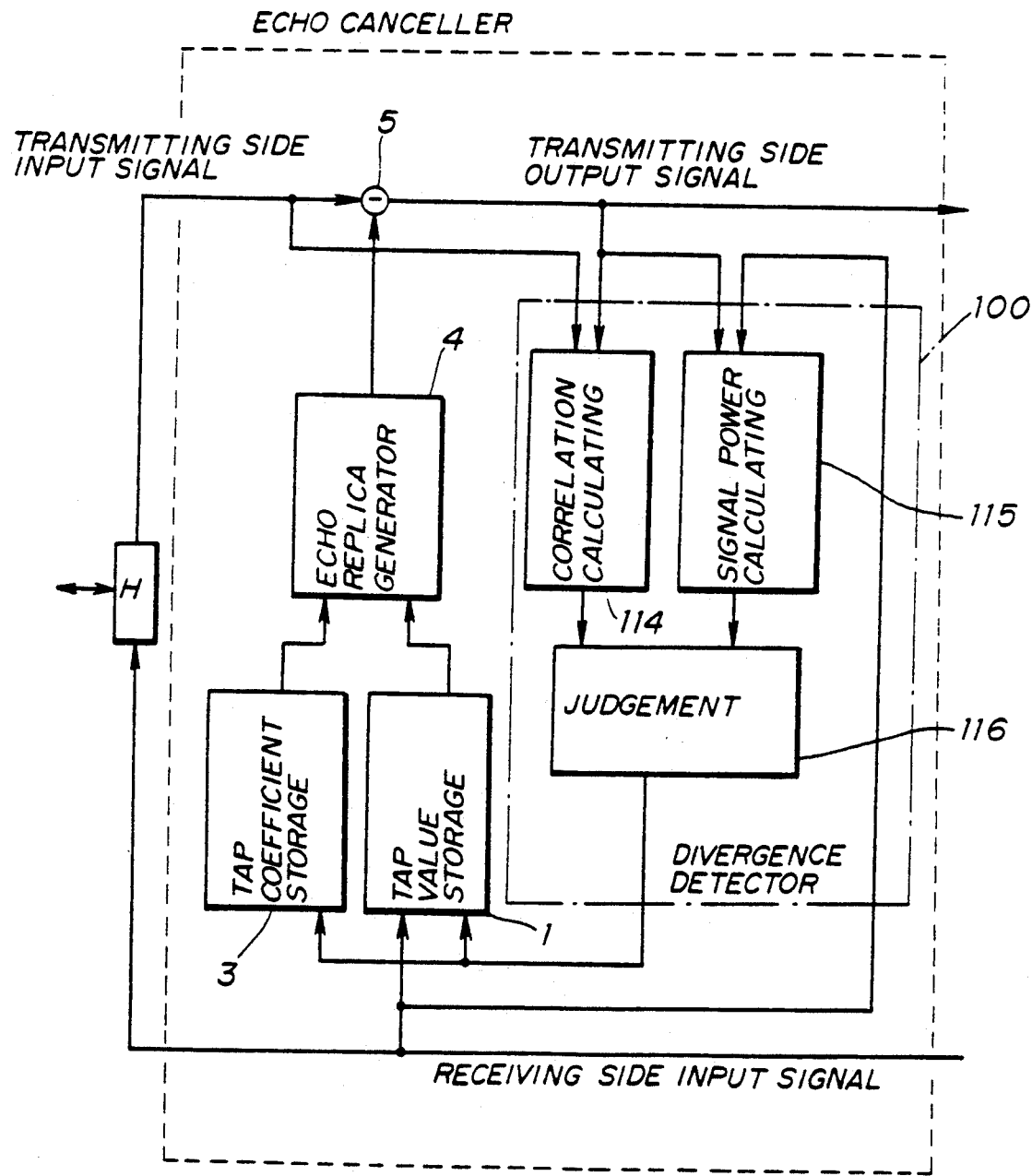
FIG. 16 is a system block diagram showing a third embodiment of the echo canceller according to the present invention.

Next, a description will be given of a third embodiment of the echo canceller according to the present invention, by referring to FIG. 16. In FIG. 16, those parts which are the same as those corresponding parts in FIG. 8 are designated by the same reference numerals, and a description thereof will be omitted.

In this embodiment, the echo canceller is provided with a divergence detector 100 which includes a correlation calculating part 114, a signal power calculating part 115 and a judgement part 116 which are coupled as shown in FIG. 16.

The correlation calculating part 114 calculates a correlation between the transmitting side input signal and the transmitting side output signal. The signal power calculating part 115 calculates a signal power based on the transmitting side output signal and the receiving side input signal. The judgement part 116 receives outputs of the correlation calculating part 114 and the signal power calculating part 115 and outputs a detection signal which clears the tap value storage 1 and the tap coefficient storage 3 when no correlation exists between the transmitting side input signal and the transmitting side output signal and the signal powers of the transmitting side output signal and the receiving side input signal are approximately the same.

In the state where the tap coefficients of the adaptive filter part diverge, signals generated due to the diverged tap coefficients are transmitted within the closed loop which is formed by the pair of echo cancellers. For this reason, the signal powers of the receiving side input signal and the transmitting side output signal become approximately the same. In the case of the one-way communication (single talk), it cannot be said that the signal powers of the receiving side input signal and the transmitting side output signal become approximately the same regardless of which one of the two parties becomes the speaker. However, in the case of the simultaneous two-way communication (double talk), when the two speakers by chance talk at the same level, the signal powers of the receiving side input signal and the transmitting side output signal may become approximately the same. Hence, the correlation between the transmitting side input signal and the transmitting side output signal is obtained, and the divergent state and the double talk are distinguished depending on the correlation.

The correlation calculating part 114 obtains the correlation between the input and output signals of the subtractor 5, that is, the transmitting side input signal and the transmitting side output signal. In the divergent state, the signal powers of the transmitting side input signal and the transmitting side output signal become approximately the same. On the other hand, in the case of double talk, the signal powers of the transmitting side input signal and the transmitting side output signal may become approximately the same but this double talk state is not the divergent state and should be distinguished from the divergent state. Accordingly, the correlation between the transmitting side input signal and the transmitting side output signal is obtained so as to distinguish the divergent state from the double talk state.

In the double talk state, the voice of the same speaker becomes the base and the echo signal and the residual echo signal are added thereto. Hence, there is a strong correlation between the transmitting side input signal and the transmitting side output signal. On the other hand, there is no correlation between the transmitting side input signal and the transmitting side output signal in the divergent state. The correlation calculating part 114 calculates the correlation between the transmitting side input signal and the transmitting side output signal for these reasons.

The signal power calculating part 115 calculates the signal powers of the receiving side input signal and the transmitting side output signal. When the echo canceller is in the divergent state, the signal powers of the receiving side input signal and the transmitting side output signal are approximately the same. On the other hand, in the case of the double talk, the signal powers of the receiving side input signal and the transmitting side output signal also become approximately the same. The judgement part 116 receives the outputs of the correlation calculating part 114 and the signal power calculating part 115, and outputs the detection signal for clearing the tap value storage 1 and the tap coefficient storage 3 when two conditions are satisfied simultaneously. The two conditions are that the signal powers of the receiving side input signal and the transmitting side output signal are approximately the same, and that the transmitting side input signal and the transmitting side output signal have virtually no correlation. Therefore, when the echo canceller diverges, it is possible to automatically self reset the echo canceller.

Figure 17:
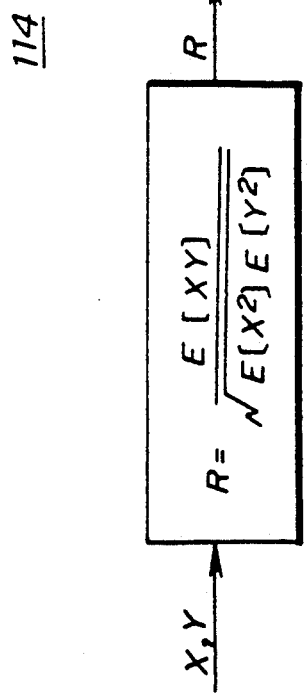
FIG. 17 is a system block diagram for explaining the operation of a correlation calculating part shown in FIG. 16.

FIG. 17 shows an embodiment of the correlation calculating part 114. When two input signals X and Y are input to the correlation calculating part 114, the calculation described by the following formula is carried out to obtain a correlation function R. For example, it is assumed for the sake of convenience that X denotes the transmitting side input signal and Y denotes the transmitting side output signal.

$$R = E[XY] \times 1/(E[X^2] \times E[Y^2])^{1/8}$$

where
$X = X_n \sim X_{n-M}$
$Y = Y_n \sim Y_{n-M}$
$E[XY] = (1/M)\Sigma X_{n-i} Y_{n-i}$
$E[X^2] = (1/M)\Sigma X_{n-i}$
$E[Y^2] = (1/M)\Sigma Y_{n-i}$.

The correlation function R becomes larger as the correlation between the signals X and Y becomes stronger, and becomes smaller as the correlation between the signals X and Y becomes weaker.

The signal power calculating part 115 may use the methods described above in conjunction with FIGS. 10 and 11.

Figure 18:
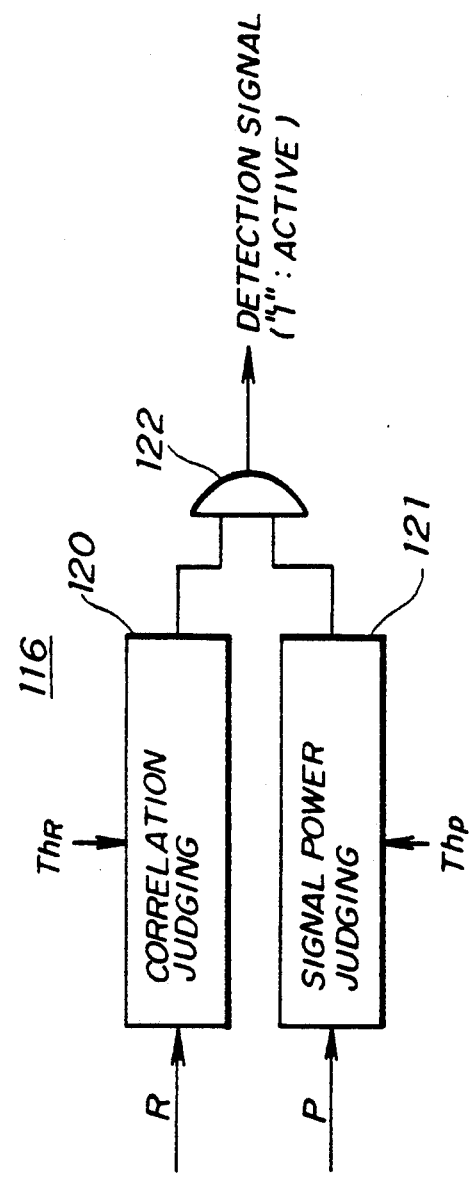
FIG. 18 is a system block diagram showing an embodiment of a judgement part shown in FIG. 16.

FIG. 18 shows an embodiment of the judgement part 116. The judgement part 116 includes a correlation judging part 120, a signal power judging part 121, and an AND circuit 122 which are coupled as shown.

The correlation judging part 120 compares the correlation function R from the correlation calculating part 114 and a correlation function threshold value $Th_R$ and outputs a signal "1" when R $< Th_R$. The signal power judging part 121 compares the signal power P from the signal power calculating part 115 and a signal power threshold value $Th_P$ and outputs a signal "1" when P $> Th_P$. The AND circuit 122 outputs a signal "1" as the detection signal in response to the output signals of the correlation judging part 120 and the signal power judging part 121.

The correlation judging part 120 outputs the signal "1" when the correlation function R is smaller than the threshold value $Th_R$. On the other hand, the signal power judging part 121 outputs the signal "1" when both the signal powers of the receiving side input signal and the transmitting side output signal are larger than the threshold value $Th_P$. The AND circuit 122 outputs the signal "1" only when the signals from the correlation judging part 120 and the signal power judging part 121 are both "1". The two conditions described above are simultaneously satisfied when the AND circuit 122 outputs the signal "1". In other words, the divergence of the echo canceller is detected when the AND circuit 122 outputs the signal "1".

Of course, the signal power calculating part in this third embodiment is not limited to that shown in FIG. 16. For example, the signal power calculating part 115 may be replaced by any of the corresponding parts of the first and second embodiments and the modifications of the first embodiment.

Further, the present invention is not limited to these embodiments, but various variations and modifications may be made without departing from the scope of the present invention.

What is claimed is:

1. An echo canceller comprising:
echo replica generating means for generating an echo replica signal based on a received signal and including filter having tap coefficients;
subtracting means coupled to said echo replica generating means for obtaining a transmitting side output signal by subtracting the echo replica signal generated by said echo replica generating means from a transmitting side input signal;
divergence detecting means coupled to said echo replica generating means and said subtracting means for detecting a divergence of the echo canceller based on the transmitting side input signal and the echo replica signal, the detecting being based on a comparison between a first power of the transmitting side input signal and a second power of the echo replica signal and for outputting a detection signal when the divergence is detected; and
resetting means coupled to said divergence detecting means for automatically resetting said echo replica generating means in response to the detection signal from said divergence detecting means.

2. The echo canceller as claimed in claim 1, wherein said filter in said echo replica generating means comprises an adaptive filter including a storage for storing the received signal as tap values, and for storing tap coefficients corresponding to the tap values, an echo replica generator for generating the echo replica signal based on the tap values and the tap coefficients corresponding to the tap values, and a tap coefficient updating circuit for updating the tap coefficients based on the received signal and the transmitting side output signal so that the tap coefficients converge, said divergence of the echo canceller being a divergence of the tap coefficients of said adaptive filter.

3. The echo canceller as claimed in claim 2, wherein said resetting means resets data stored in said storage to zero in response to the detection signal from said divergence detecting means.

4. The echo canceller as claimed in claim 1, wherein said divergence detecting means includes a divergence detector coupled to said echo replica generating means and said subtracting means for detecting the divergence of the echo canceller and outputting the detection signal when a ratio of the echo replica signal to the transmitting side input signal becomes greater than a predetermined ratio.

5. The echo canceller as claimed in claim 1, wherein said divergence detecting means includes a divergence detector for detecting the divergence of the echo canceller only when a ratio of the echo replica signal to the transmitting side input signal becomes greater than a predetermined ratio and no correlation exists between the transmitting side input signal and the transmitting side output signal.

6. An echo canceller comprising:
echo replica generating means for generating an echo replica signal based on a received signal and including a filter having tap coefficients;
subtracting means coupled to said echo replica generating means for obtaining a transmitting side output signal by subtracting the echo replica signal generated by said echo replica generating means from a transmitting side input signal;
divergence detecting means coupled to said echo replica generating means and said subtracting means for detecting a divergence of the echo canceller based on the transmitting side output signal and the echo replica signal, the detecting being based on a comparison between a predetermined threshold value and at least one of a first power of the transmitting side output signal and a second power of the echo replica signal and for outputting a detection signal when the divergence is detected; and
resetting means coupled to said divergence detecting means for automatically resetting said echo replica generating means in response to the detection signal from said divergence detecting means.

7. The echo canceller as claimed in claim 6, wherein said filter in said echo replica generating means comprises an adaptive filter including a storage for storing the received signal as tap values, and for storing tap coefficients corresponding to the tap values, an echo replica generator for generating the echo replica signal based on one of the tap values and a corresponding one of the tap coefficients, and a tap coefficient updating circuit for updating the tap coefficients based on the received signal and the transmitting side output signal so that the tap coefficients converge, said divergence of the echo canceller being a divergence of the tap coefficients of said adaptive filter.

8. The echo canceller as claimed in claim 7, wherein said resetting means resets data stored in said storage to zero in response to the detection signal from said divergence detecting means.

9. The echo canceller as claimed in claim 6, wherein said divergence detecting means includes a divergence detector coupled to said echo replica generating means and said subtracting means for detecting the divergence of the echo canceller and outputting the detection signal when one of the echo replica signal and the transmitting side output signal exceeds the predetermined threshold value.

10. The echo canceller as claimed in claim 6, wherein said divergence detecting means includes a divergence detector coupled to said echo replica generating means and said subtracting means for detecting the divergence of the echo canceller and outputting the detection signal when both the echo replica signal and the transmitting side output signal exceed the predetermined threshold value.

11. The echo canceller as claimed in claim 6, wherein said divergence detecting means includes first means for outputting a first detection signal when the transmitting side output signal exceeds the predetermined threshold value, second means for outputting a second detection signal when the echo replica signal exceeds the predetermined threshold value, and an OR circuit supplied with the first and second detection signals of said first and second means for outputting the detection signal.

12. The echo canceller as claimed in claim 11, wherein the predetermined threshold value is set to a maximum output value of a PCM coder/decoder which is coupled to a line via the echo canceller.

13. The echo canceller as claimed in claim 6, wherein said divergence detecting means includes first means for outputting a first detection signal when the transmitting side output signal exceeds the predetermined threshold value, second means for outputting a second detection signal when the echo replica signal exceed the predetermined threshold value, and an AND circuit supplied with first and second detection signals of said first and second means for outputting the detection signal.

14. The echo canceller as claimed in claim 13, wherein the predetermined threshold value is set to a maximum output value of a PCM coder/decoder which is coupled to a line via the echo canceller.

15. The echo canceller as claimed in claim 6, wherein said divergence detecting means includes a divergence detector for detecting the divergence of the echo canceller only when at least one of the echo replica signal and the transmitting side output signal exceeds the predetermined threshold value and no correlation exists between the transmitting side input signal and the transmitting side output signal.

16. An echo canceller comprising:
echo replica generating means for generating an echo replica signal based on a received signal and including a filter having tap coefficients;
subtracting means coupled to said echo replica generating means for obtaining a transmitting side output signal by subtracting the echo replica signal generated by said echo replica generating means from a transmitting side input signal;
divergence detecting means coupled to said echo replica generating means and said subtracting means for detecting a divergence of the echo canceller based on the transmitting side input signal and the echo replica signal, the detecting being based on a first comparison between a first power of the transmitting side input signal and a second power of the transmitting side output signal and a second comparison between a predetermined value and the first power of the transmitting side output signal and for outputting a detection signal when the divergence is detected; and
resetting means coupled to said divergence detecting means for automatically resetting said echo replica generating means in response to the detection signal from said divergence detecting means.

17. The echo canceller as claimed in claim 16, wherein said echo replica generating means comprises an adaptive filter including a storage for storing the received signal as tap values, and for storing tap coefficients corresponding to the tap values, an echo replica generator for generating the echo replica signal based on the tap values and the tap coefficients corresponding to the tap values, and a tap coefficient updating circuit for updating the tap coefficients based on the received signal and the transmitting side output signal so that the tap coefficients converge, said divergence of the echo canceller being a divergence of the tap coefficients of said adaptive filter.

18. The echo canceller as claimed in claim 17, wherein said resetting means resets data stored in said storage to zero in response to the detection signal from said divergence detecting means.

19. The echo canceller as claimed in claim 16, wherein said divergence detecting means includes a divergence detector coupled to said echo replica generating means for detecting the divergence of the echo canceller and outputting the detection signal when a ratio of the first power of the transmitting side input signal to the second power of the transmitting side output signal becomes greater than a predetermined ratio and the first power of the transmitting side output signal becomes greater than the predetermined value.

20. The echo canceller as claimed in claim 16, wherein said divergence detecting means includes a divergence detector for detecting the divergence of the echo canceller only when a ratio of the transmitting side input signal to the transmitting side output signal becomes greater than a predetermined ratio and no correlation exists between the transmitting side input signal and the transmitting side output signal.

21. An echo canceller comprising:
echo replica generating means for generating an echo replica signal based on a received signal and including a filter having tap coefficients;
subtracting means coupled to said echo replica generating means for obtaining a transmitting side output signal by subtracting the echo replica signal generated by said echo replica generating means from a transmitting side input signal;
divergence detecting means coupled to said subtracting means for detecting a divergence of the echo canceller based on the transmitting side input signal and the echo replica signal, the detecting being based on a comparison between a first power of the transmitting side output signal and a second power of a receiving side input signal and a correlation between the transmitting side input signal and the transmitting side output signal, and for outputting a detection signal when the divergence is detected; and
resetting means coupled to said divergence detecting means for automatically resetting said echo replica generating means in response to the detection signal from said divergence detecting means.

22. The echo canceller as claimed in claim 21, wherein said divergence detecting means includes a divergence detector for detecting the divergence of the echo canceller only when the first power of the transmitting side output signal and the second power of the receiving side input signal are approximately the same and no correlation exists between the transmitting side input signal and the transmitting side output signal.

23. The echo canceller as claimed in claim 22, wherein said divergence detecting means includes a signal power calculating part for calculating the first and second powers forming calculated first and second powers of the transmitting side output signal and the receiving side input signal, a correlation calculating part for calculating the correlation between the transmitting side input signal and the transmitting side output signal, and a judgement part for determining the divergence and outputting the detection signal only when the first and second calculated powers are approximately the same and the correlation between the transmitting side input signal and the transmitting side output signal is less than a predetermined threshold value.

* * * * *

UNITED STATES PATENT AND TRADEMARK OFFICE
CERTIFICATE OF CORRECTION

PATENT NO. : 5,305,309
DATED : APRIL 19, 1994
INVENTOR(S) : Kaoru CHUJO, et al.

It is certified that error appears in the above-indentified patent and that said Letters Patent is hereby corrected as shown below:

Col. 14, line 33, (formula), "$E[Y^2])^{178}$" should be —$E[Y^2])^{1/2}$— line 39, "$\Sigma X_{n-i}$." should be --$\Sigma X^2_{n-1}$.--;

line 40, "$\Sigma Y_{n-i}$." should be --$\Sigma Y^2_{n-1}$.--.

Col. 17, line 16, "exceed" should be --exceeds--.

Signed and Sealed this

Twenty-fifth Day of April, 1995

Attest:

BRUCE LEHMAN

*Attesting Officer*   *Commissioner of Patents and Trademarks*